(12) United States Patent
Bois et al.

(10) Patent No.: US 12,411,282 B2
(45) Date of Patent: Sep. 9, 2025

(54) MANAGING MONOLITHIC INTEGRATION OF WAVEGUIDES

(71) Applicant: Ciena Corporation, Hanover, MD (US)

(72) Inventors: Antoine Bois, Quebec (CA); Raphael Beaupré-Laflamme, Quebec (CA); Charles Baudot, Quebec (CA)

(73) Assignee: Ciena Corporation, Hanover, MD (US)

( * ) Notice: Subject to any disclaimer, the term of this patent is extended or adjusted under 35 U.S.C. 154(b) by 369 days.

(21) Appl. No.: 18/164,143

(22) Filed: Feb. 3, 2023

(65) Prior Publication Data

US 2024/0264375 A1 Aug. 8, 2024

(51) Int. Cl.
*G02B 6/122* (2006.01)
*G02B 6/13* (2006.01)

(52) U.S. Cl.
CPC ............ *G02B 6/1228* (2013.01); *G02B 6/13* (2013.01)

(58) Field of Classification Search
CPC ........... G02B 6/12; G02B 6/1228; G02B 6/13
See application file for complete search history.

(56) References Cited

U.S. PATENT DOCUMENTS

| 7,343,059 | B2 | 3/2008 | Beausoleil et al. | |
|---|---|---|---|---|
| 2004/0264905 | A1* | 12/2004 | Blauvelt | G02B 6/1228 385/129 |
| 2015/0214122 | A1* | 7/2015 | Vermeulen | G01M 11/30 438/14 |
| 2018/0188454 | A1* | 7/2018 | Lipson | G02B 6/3652 |
| 2019/0310433 | A1 | 10/2019 | Yoo et al. | |
| 2022/0004029 | A1 | 1/2022 | Meng et al. | |
| 2022/0283391 | A1* | 9/2022 | Zhang | H10F 77/413 |

FOREIGN PATENT DOCUMENTS

CN 101641622 A * 2/2010 ........... G02B 6/1228

OTHER PUBLICATIONS

Takahashi, Hiroshi. "Planar lightwave circuit devices for optical communication: present and future." Active and Passive Optical Components for WDM Communications III. vol. 5246. SPIE, 2003.
Polster, Robert, et al. "Wafer-scale high-density edge coupling for high throughput testing of silicon photonics" Optical Fiber Communication Conference, OSA (2018), https://lipson.ee.columbia.edu/sites/default/files/content/docs/Wafer-scale%20high-density%20edge%20coupling%20for%20high.pdf.
Tae Joon Seok, et al. "Wafer-scale silicon photonic switches beyond die size limit." Optica, vol. 6, No. 4, 490-494 (2019).

* cited by examiner

*Primary Examiner* — Tina Wong
(74) *Attorney, Agent, or Firm* — Young Basile Hanlon & MacFarlane, P.C.

(57) ABSTRACT

An article comprises: one or more sets of lower index contrast layers, each comprising at least two materials having different indices of refraction, and configured to provide optical confinement based at least in part on a first numerical difference between the two indices of refraction; and one or more sets of higher index contrast layers, each comprising at least two materials having different indices of refraction, and configured to provide optical confinement based at least in part on a second numerical difference; and at least one optical coupler configured to optically couple a first of the one or more sets of lower index contrast layers to a first of the one or more sets of higher index contrast layers. The first numerical difference is smaller than the second numerical difference.

20 Claims, 16 Drawing Sheets

MANAGING MONOLITHIC INTEGRATION OF WAVEGUIDES

TECHNICAL FIELD

This disclosure relates to managing monolithic integration of waveguides.

BACKGROUND

A silicon photonic (SiPhot) platform, which can be based on Silicon-On-Insulator (SOI), is an example of photonic platform used to make opto-electrical active devices, optical passive devices, and optical waveguides in a Si layer of the SiPhot platform. In a SiPhot platform, the optical signals carried by the optical waveguides to and from the optical passive devices can be confined within the Si layer, for example, because there is an underlying buried oxide (BOX) made up of thermal $SiO_2$ (e.g., Si oxidized using a thermal process) and an overlying $SiO_2$ cladding surrounding the Si devices. The index contrast between the high refractive index Si and low refractive index $SiO_2$ is responsible for the confinement. The $SiO_2$ cladding can be deposited using various precursors, such as tetra ethyl ortho silicate (TEOS) and various deposition techniques, such as chemical vapor deposition (CVD). Some advantages of SiPhot platforms are: (1) the ability to make both active and passive devices and (2) the ability to make very compact circuits due to the high index contrast between Si and $SiO_2$.

SUMMARY

In one aspect, in general, an article of manufacture comprises: one or more sets of lower index contrast layers, each set of lower index contrast layers comprising at least two materials having different indices of refraction, and being configured to provide optical confinement based at least in part on a first numerical difference between the two indices of refraction of the materials of that lower index contrast layer; and one or more sets of higher index contrast layers, each set of higher index contrast layers comprising at least two materials having different indices of refraction, and being configured to provide optical confinement based at least in part on a second numerical difference between the two indices of refraction of the materials of that higher index contrast layer; and at least one optical coupler configured to optically couple a first of the one or more sets of lower index contrast layers to a first of the one or more sets of higher index contrast layers; wherein the first numerical difference is smaller than the second numerical difference.

In another aspect, in general, a method comprises: forming one or more sets of lower index contrast layers, each set of lower index contrast layers comprising at least two materials having different indices of refraction, and being configured to provide optical confinement based at least in part on a first numerical difference between the two indices of refraction of the materials of that lower index contrast layer; and forming one or more sets of higher index contrast layers, each set of higher index contrast layers comprising at least two materials having different indices of refraction, and being configured to provide optical confinement based at least in part on a second numerical difference between the two indices of refraction of the materials of that higher index contrast layer; and forming at least one optical coupler configured to optically couple a first of the one or more sets of lower index contrast layers to a first of the one or more sets of higher index contrast layers; wherein the first numerical difference is smaller than the second numerical difference.

Aspects can include one or more of the following features.

The optical coupler comprises a spot size converter that is configured to provide coupling between guided mode sizes that differ by at least a factor of four.

The spot size converter comprises a plurality of segments of a material having an index of refraction that is higher than an index of refraction of a material having the lowest index of refraction of the first of the one or more sets of lower index contrast layers, and higher than an index of refraction of a material having the lowest index of refraction of the first of the one or more sets of higher index contrast layers.

The spot size converter comprises one or more segments of varying size transverse to a propagation axis of a guided mode of the first of the one or more sets of lower index contrast layers or a guided mode of the first of the one or more sets of higher index contrast layers.

The optical coupler is located in one or more layers between the first of the one or more sets of lower index contrast layers and the first of the one or more sets of higher index contrast layers.

The optical coupler comprises at least one segment in a layer that is in an overlapping plane with a layer in the first of the one or more sets of lower index contrast layers, or a layer in the first of the one or more sets of higher index contrast layers.

The article of manufacture further comprises a second optical coupler that optically couples at least one of the one or more sets of lower index contrast layers to an external waveguide.

The article of manufacture further comprises one or more optical elements located within at least one of the one or more sets of lower index contrast layers, wherein the one or more optical elements are configured to separate and/or combine light.

The article of manufacture further comprises one or more electrically conductive elements that conduct current from one or more exposed electrical pads to one or more electro-optical elements.

The one or more electro-optical elements comprise at least one of a phase shifter or a photodiode.

The one or more electro-optical elements are located within at least one of the one or more sets of higher index contrast layers.

At least one of the one or more sets of lower index contrast layers is located over at least two different sets of higher index contrast layers located in different respective patterned portions of a wafer.

Aspects can have one or more of the following advantages.

Some implementations of the multi-index contrast structure(s) (MICS) described herein allow for lower coupling losses and smaller footprint. For example, one or more sets of lower index contrast layers (LICLs) are used to provide structures that are integrated with and coupled to structures of a photonic integrated circuit (PIC) that are formed in one or more sets of higher index contrast layers (HICLs). By comparison, stand-alone packages containing LICLs, which are coupled to a separate PIC at the package level, can require active alignment or an imperfect passive bonding. Such an alignment may cause additional losses and complicate the assembly. MICS can be monolithically integrated into a single semiconductor die, possibly avoiding issues related to assembly and integration. Additionally, MICS may be manufactured at a lower cost since, for example, the LICLs can be added to the main PIC die itself directly during its fabrication, possibly requiring fewer parts and assembly steps. Furthermore, MICS can provide design flexibility; for example, a photonic designer could implement non-traditional functions, within LICLs located at various places, into the PIC's circuit.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
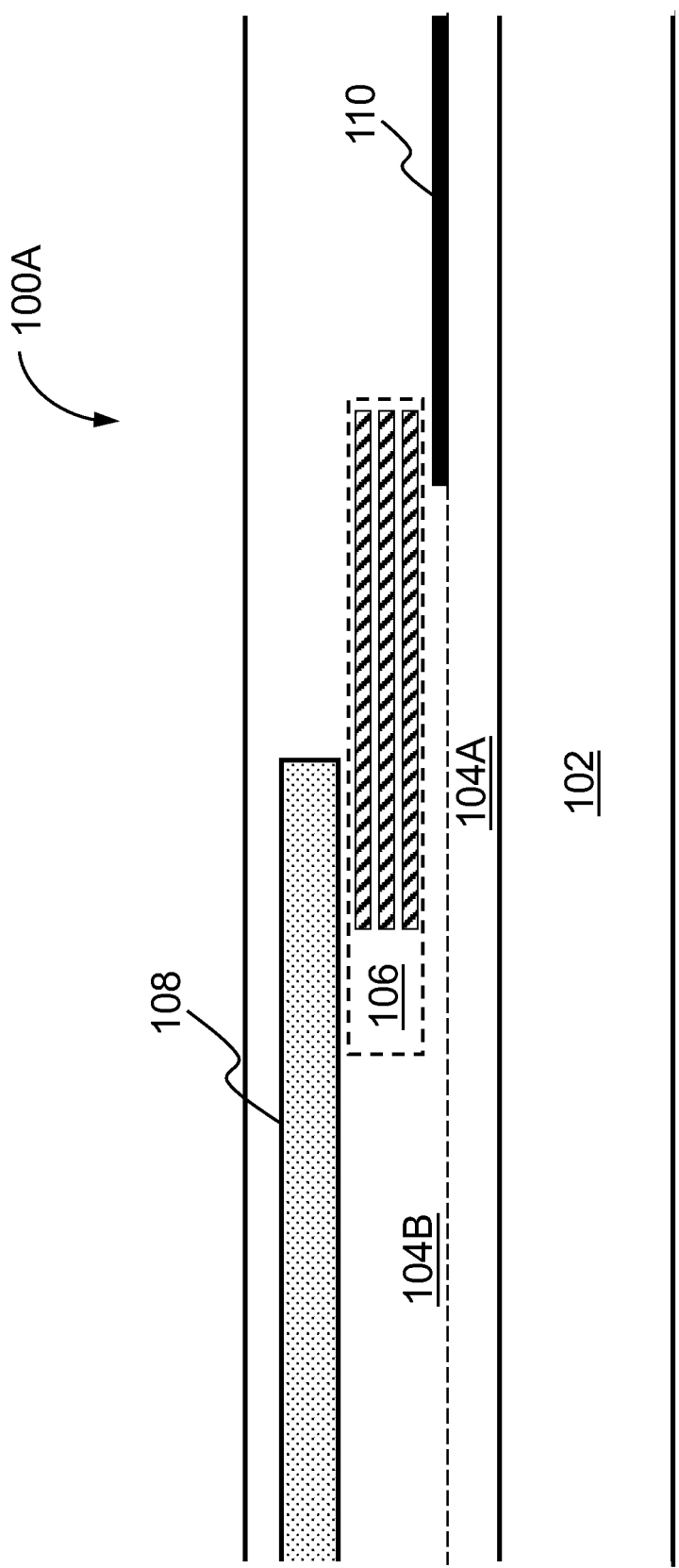
FIG. 1A is a schematic diagram of a portion of an example multi-index contrast structure, viewed from the side.

Complementary metal-oxide-semiconductor (CMOS) and other fabrication techniques are generally used to fabricate electronic integrated circuits, which operate using electrical signals (e.g., voltage signals and/or current signals). Similar fabrication techniques can be used to fabricate photonic integrated circuits (PICs) in SiPhot or other photonic platforms. PICs often include optical waveguides for transporting optical waves to and from photonic devices. An optical waveguide is a structure that confines and guides the propagation of an electromagnetic wave. Some electromagnetic waves have a spectrum that has a peak wavelength that falls in a particular range of optical wavelengths (e.g., between about 100 nm to about 1 mm, or some subrange thereof), also referred to as optical waves, light waves, or simply light. These optical waveguides can be fabricated, for example, by forming a core structure from material having a higher index of refraction surrounded by a cladding comprising one or more materials (or air) that have a lower refractive index, as described in more detail below. The difference between the core index and the cladding index is referred to as an index contrast, which can be quantified in a variety of ways.

One potential disadvantage of SiPhot platforms can be high propagation loss encountered by the optical signal in higher index contrast layers (HICLs), which may result from sidewall roughness at the material interface. The impact of sidewall roughness on propagation losses can be exacerbated by a larger magnitude of the index of refraction contrast between the two materials. Consequently, lower index contrast materials can result in lower losses. However, such devices formed in LICLs can often have a larger footprint.

Fabrication of LICLs can involve starting from a Si or quartz handle, followed by depositing $SiO_2$ through a process known as Flame Hydrolysis Deposition (FHD) in three successive steps to form a bottom cladding, a core layer, and a top cladding. The core layer can be further developed by lithography to form waveguiding structures. $GeO_2$ dopants can be added to the core layer during its deposition to increases its index above that of the cladding. The low index contrast between the core and cladding can result in low-loss devices, but with high footprints.

Multi-index contrast structure(s) (MICS), as described herein, can monolithically integrate photonic structures comprising LICLs (e.g., structures based on a $SiO_2$ substrate, and structures sometimes referred to as planar lightwave circuits (PLCs)) with other electronic and/or photonic structures comprising HICLs (e.g., structures based on CMOS-compatible active silicon-on-insulator (SOI) photonic platforms, and/or CMOS electronic platforms).

Using a combination of devices made using both HICLs and LICLs may provide the advantages of each platform. But, there are two potential disadvantages to attempting to package those devices formed from separate platforms: (1) the optical interconnection (coupling) between different devices at the package level can be difficult, and (2) the resulting disparity in footprints can make it challenging for cointegration. Consequently, having MICS can mitigate the above two issues by providing optical coupling at the die level (as described in more detail below) and by monolithically integrating HICLs and LICLs.

There are a large variety of oxides used in traditional CMOS platforms (e.g., silicon rich oxide (SRO), Phosphosilicate glass (PSG), Fluorosilicate glass (FSG), Borosilicate glass (BSG)). Each oxide has unique optical properties and a different refractive index. Thus, exploiting those oxides in a SiPhot platform can enable fabrication of a LICL on a SiPhot die without the use of doping $GeO_2$ that may be found in stand-alone LICL fabrication. Deposition, patterning, and encapsulation of a relevant oxide can generate high quality LICLs. SiPhot dies can be encapsulated with a low index $SiO_2$. Thus, one may select an oxide bearing a slightly higher index to constitute the core and then, clad further the patterned structure with an additional low index layer.

SiPhot platforms may have integrated spot size converters (SSCs), which are devices used to optically interconnect the waveguides coupled to the relatively small Si devices in a PIC with larger external waveguides outside the PIC, such as optical fibers. The same SSCs can be modified to optically interconnect HICLs (e.g., Si layers) with LICLs. For example, a device formed in the same layers as a waveguide in a set of underlying HICLs can be optically connected to a device formed in the same layers as a waveguide in a set of overlying HICLs. In such an example, both device types would be stacked on each other and the resulting die footprint would be almost unchanged. During the cointegration fabrication method, intentionally spacing HICLs and LICLs far enough from each other using intervening layers and/or buffer materials may prevent different layers from interfering with each other.

LICLs can be especially beneficial for sensitive devices such as interferometers, including the likes of optical multiplexers and de-multiplexers. A low-index contrast tends to reduce sensitivity to fabrication and to environmental perturbations (e.g., temperature). Devices for polarization insensitive operation, with little to no birefringence, for example with square cross-sections, can be easier to realize within LICLs.

Optical interconnects between heterogenous layers (e.g., between HICLs and LICLs) can be performed by adiabatic transfers (e.g., via a tapered waveguide structure, a structure composed of multiple waveguides, or a single waveguide structure). Adiabatic transfer can be particularly useful if a set of LICLs for the realization of spot-size converters is already present.

FIG. 1A shows a portion of an example MICS 100A. The MICS 100A comprises a Si handle 102, a $SiO_2$ buried oxide (BOX) layer 104A, and a variety of other layers of various materials used to form waveguides and devices on top of the BOX layer 104A with inter-layer dielectric layers including encapsulation oxide 104B (often formed from deposited $SiO_2$) between the layers of waveguides and devices. An SSC 106 optically connects a LICL core 108 and a HICL core 110. The SSC 106 can comprise multiple waveguide cores (as in this example) or a single waveguide core, and may be composed of SiN or SiON, for example. In this example, the SSC 106 maintains a constant width and constant effective index of refraction over a particular length to achieve coupling. In other examples, the SSC 106 may optically connect the LICL core 108 and the HICL core 110 via adiabatic coupling. The adiabatic coupling may be achieved through changing the effective index of refraction of the SSC 106 (e.g., by tapering the width of the waveguide structure comprising the SSC 106). Adiabatic coupling is understood to be an optimal form of evanescent coupling. Evanescent or adiabatic coupling between the LICL core 108 and the SSC 106, as well as evanescent or adiabatic coupling between the HICL core 110 and the SSC 106, can depend on the respective overlap of their waveguide structures, as well as their respective indices of refraction.

Using various etching steps prior to oxide deposition, LICLs may be formed at different heights within the semiconductor stack. For example, an etch may be formed at the level of an existing SSC which then transfers to a device layer. The light is first coupled from a fiber and processed in the LICLs, then coupled to this SSC in a direct fashion (as opposed to an adiabatic transfer).

Figure 1B:
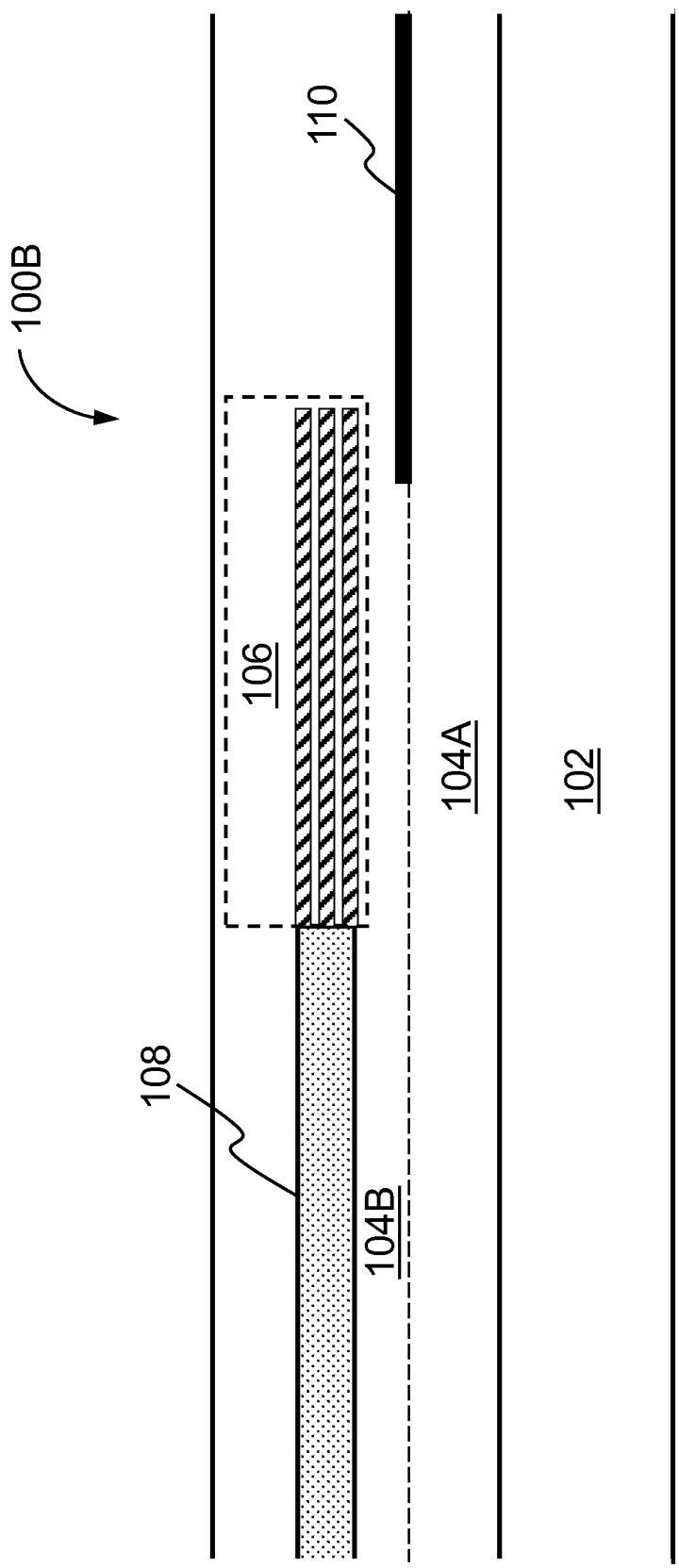
FIG. 1B is a schematic diagram of a portion of an example multi-index contrast structure, viewed from the side.

FIG. 1B shows a portion of an example MICS 100B, wherein the LICL core 108 is located above a portion of encapsulation oxide 104B and is vertically aligned with the SSC 106. The LICL core 108 may be fabricated by performing etching (i.e., removing a portion of one or more layers) after other layers (e.g., the SSC 106) have been fabricated. The SSC 106 may optically connect the LICL core 108 via direct coupling as shown this an example, or coupling that uses some intermediate core structure between the LICL core 108 and the SSC 106 in other examples.

Figure 1C:
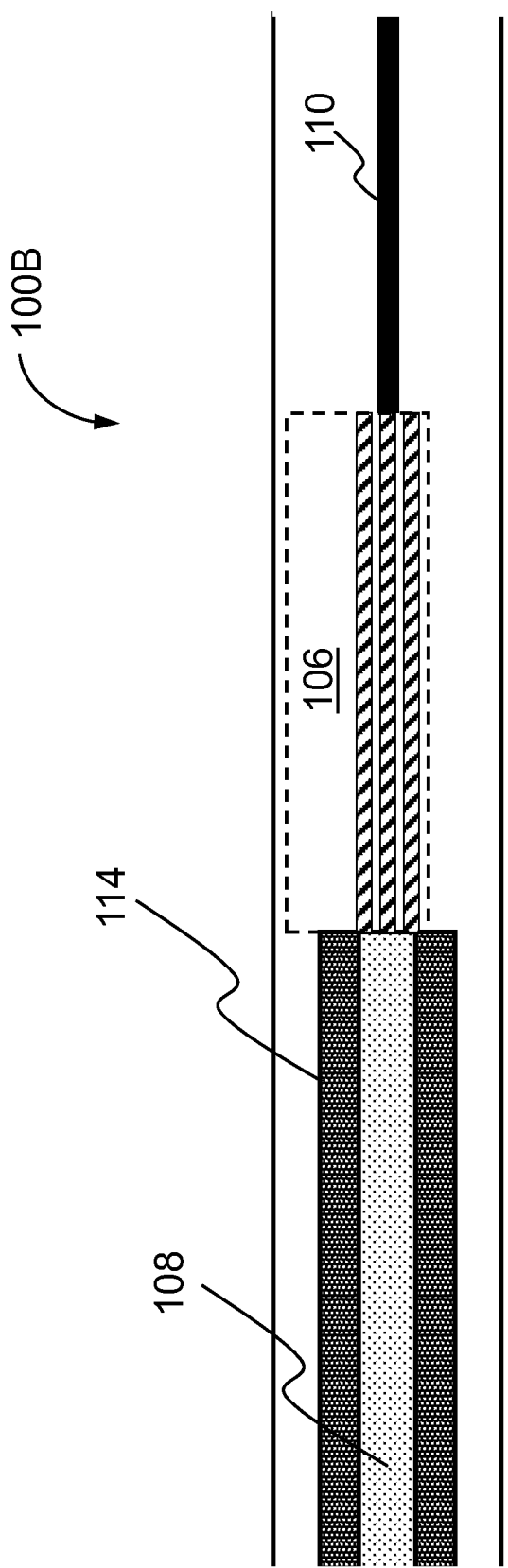
FIG. 1C is a schematic diagram of a portion of an example multi-index contrast structure, viewed from above.

FIG. 1C shows a portion of the example MICS 100B, with the etched down section 114 visible, viewed from above.

Figure 1D:
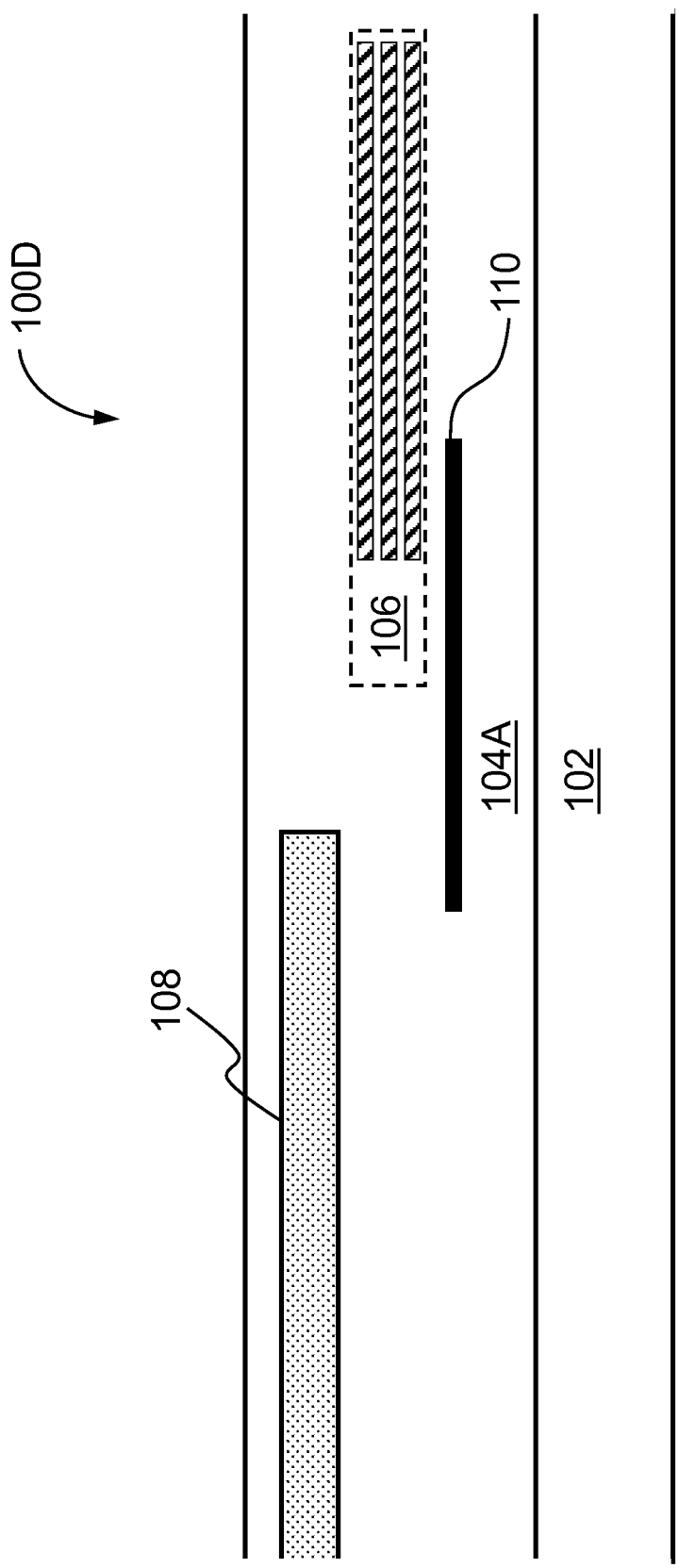
FIG. 1D is a schematic diagram of a portion of an example multi-index contrast structure, viewed from the side.

FIG. 1D shows a portion of an example MICS 100D, wherein the die on which a LICL core 108 is formed may act as a substrate, where the LICL core 108 has no direct interaction with at least one photonic circuit coupled to the HICL core 110 and SSC 106 shown in this example. Light may also exit the LICL core 108 and then re-enter through another SSC not coupled directly to the LICL core 108.

Figure 2A:
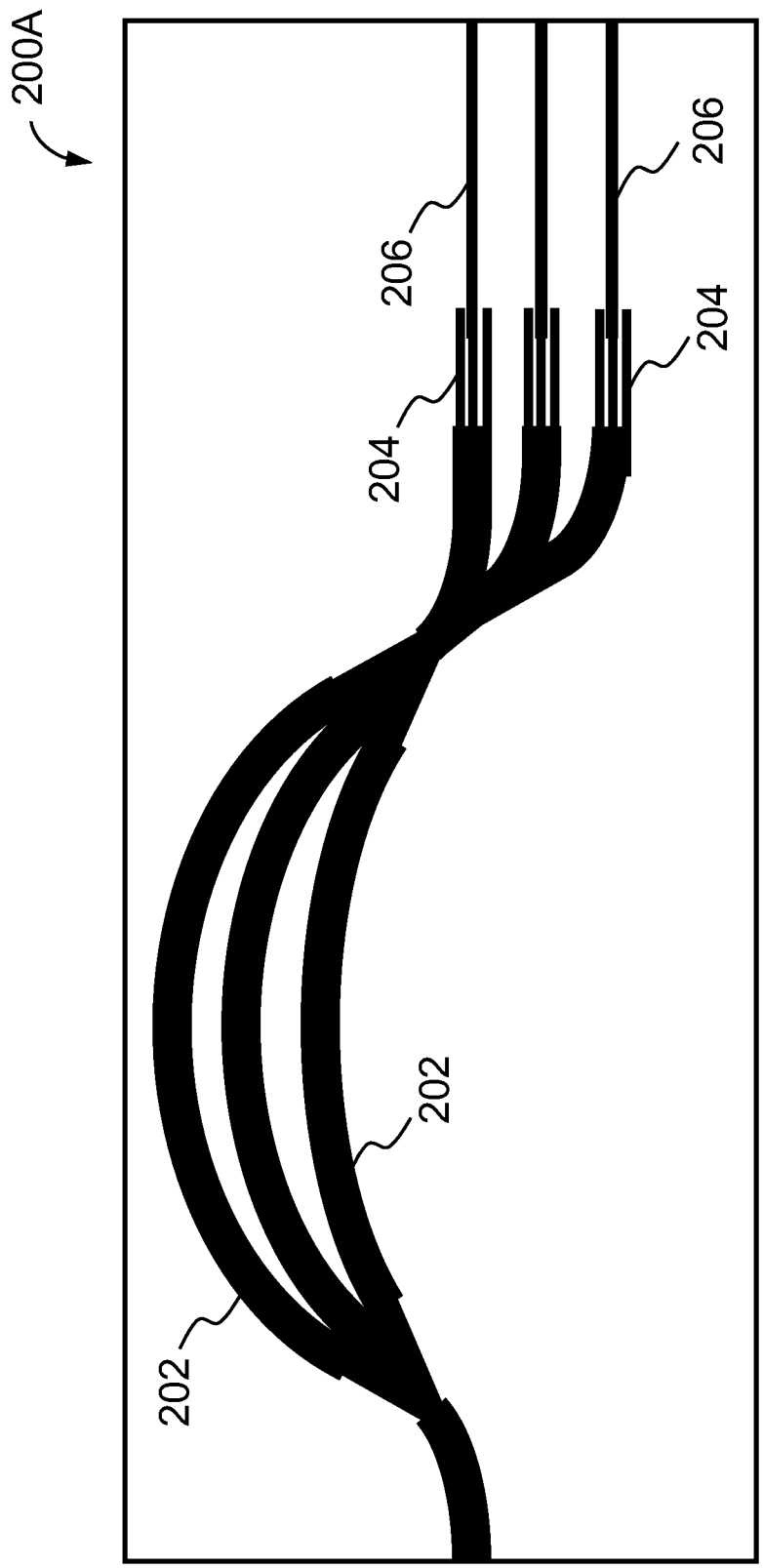
FIG. 2A is a schematic diagram of a portion of an example multi-index contrast structure being used as a signal demultiplexer.

FIG. 2A shows a portion of an example MICS 200A being used as a signal demultiplexer. A set of waveguides 202 of different lengths fabricated in LICLSs are connected at one end to an optical fiber (not shown) and at another end to a set of SSCs 204 that connect to respective HICL cores 206 (e.g., Si waveguides). This arrangement of waveguides 202 can be referred to as an arrayed waveguide grating (AWG), which has the ability to separate an incoming optical signal into different spectral components, or in the other direction to combine different spectral components into an outgoing optical signal. The MICS 200A can combine one or more optical signals derived from photonic integrated circuits (e.g., coupled to the HICL cores 206) into one waveguide (e.g., the optical fiber coupled to the AWG) by utilizing one or more sets of LICLs to fabricate the waveguides 202 of the AWG. In other examples, the waveguides 202 may include additional optical elements such as polarization optics (e.g., half waveplates).

Figure 2B:
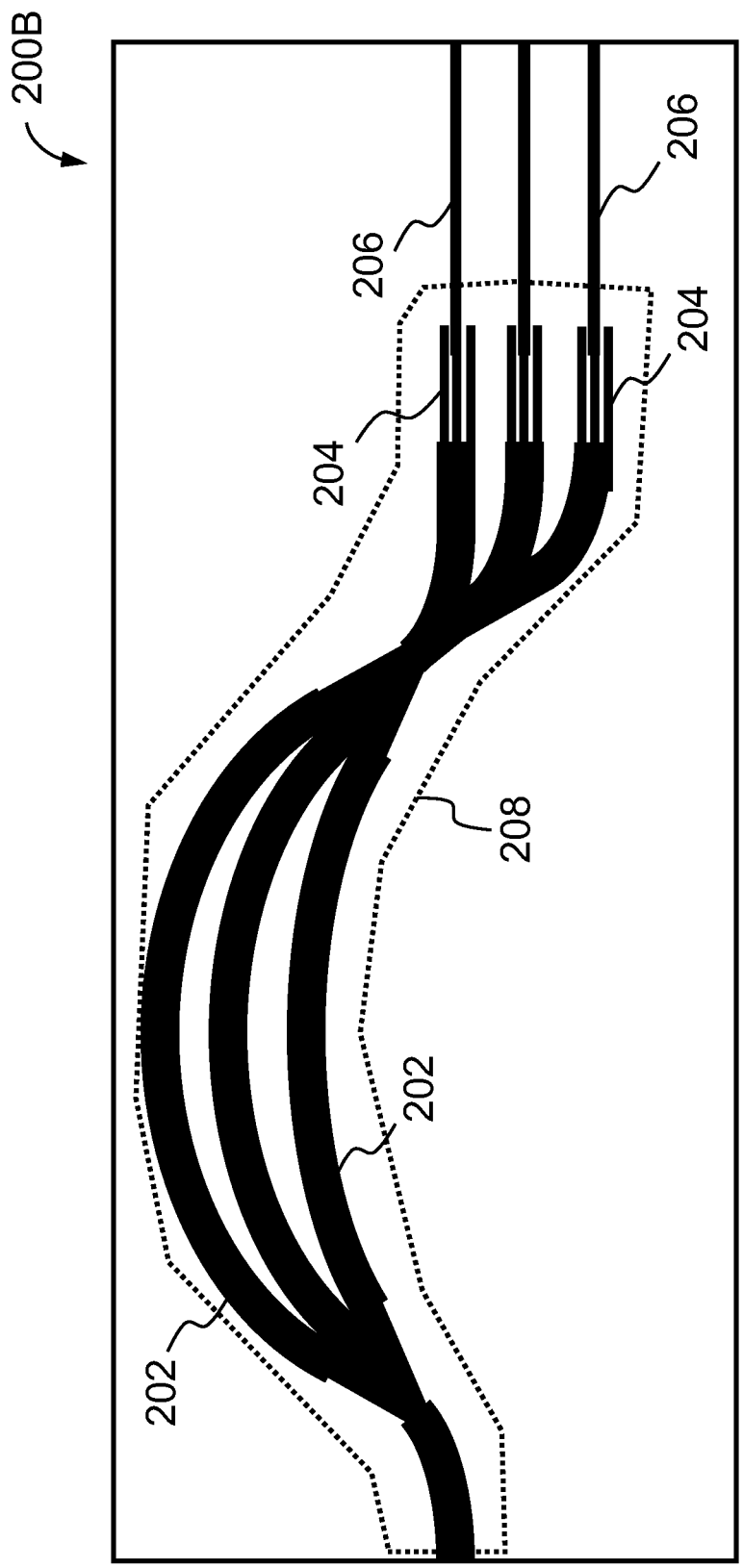
FIG. 2B is a schematic diagram of a portion of an example multi-index contrast structure comprising one or more keep-out layers.

FIG. 2B shows a portion of an example MICS 200B comprising an example more keep-out region. The structures formed in the LICLs on top, or close to back-end-of-the-line (BEOL) layers, may be used to form a keep-out region 208 for some of these BEOL layers, affecting layer density or increasing the overall dimensions of the dies. This keep-out region 208 may be optimized by adjusting conformally to the curvilinear edges of the structures in the LICLs, as opposed to simple rectangular blocks. Device design and routing among the different layers may be optimized such that the overall impact to each design, or to the dimensions of the die, remains low.

Figure 3A:
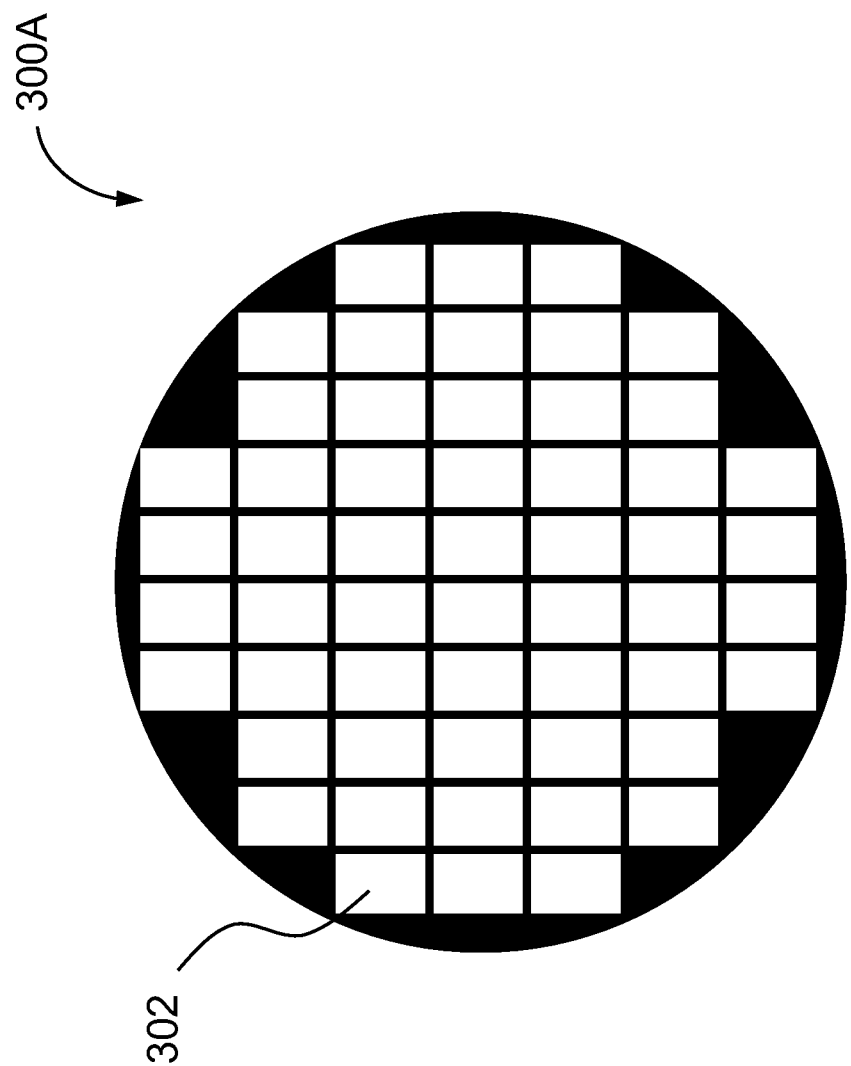
FIG. 3A is a schematic diagram of an example wafer comprising dies of the same design.

FIG. 3A shows an example wafer 300A comprising dies 302 of the same design. MICS may be used to realize larger, integrated systems that use more area of a wafer of a given diameter (e.g., 200 mm or 300 mm). For example, die sizes may be limited by photolithography maximum field dimensions (e.g., typically 25 mm×34 mm), such that larger integrated systems (e.g., interposers, optical switches, multi-core microcontrollers with large cache memory blocks) are thus limited by die size. Thus, the wafer 300A can be used to simply replicate the same dies 302, which are then separated by dicing the wafer 300A. Systems which are larger than the die dimension can be formed from multiple dies that have been produced after such dicing and assembled at package level or using 3D stacked integration. However, the process may be expensive and may come with other constraints (e.g., heat dissipation, accuracy). To overcome these possible limitations, MICS may be fabricated using interlaced lithography scanning and LICL stitching to interconnect the dies optically.

Figure 3B:
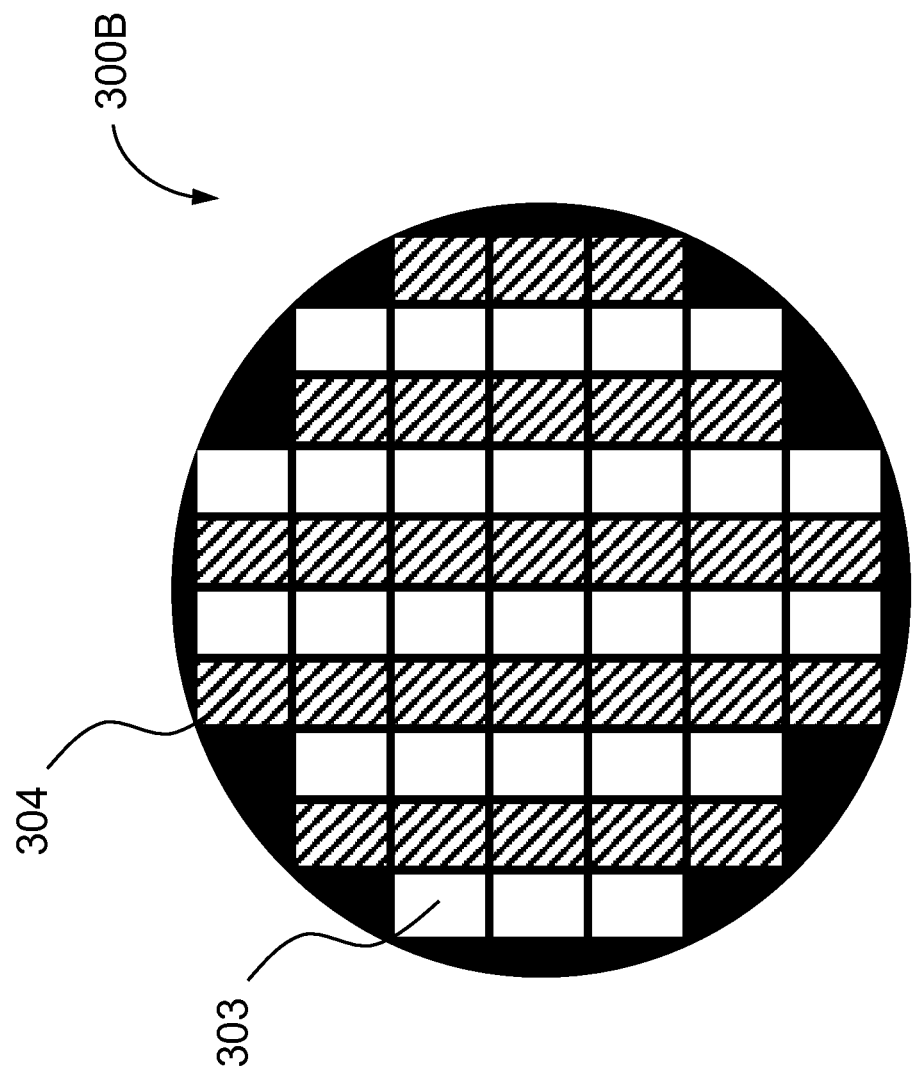
FIG. 3B is a schematic diagram of an example wafer comprising dies of two different designs arranged in an interlaced layout.

FIG. 3B shows an example wafer 300B comprising fields 303 of a first PIC design and fields 304 of a second PIC design arranged in an interlaced layout. The PICs of these different designs are called "fields" instead of "dies" since the wafer 300B is never actually diced in this example. Each individual field may be optically interconnected with one or more other fields on the wafer 300B by stitching waveguides in the HICLs of the fields together using waveguides and other structures in the LICLs formed on top of the fields 303 and 304.

Integration of structures in one or more sets of LICLs on SiPhot or other platforms that include one or more sets of HICLs, including electronic integrated circuit platforms, may also enable fabrication of larger electro-optical interposers. The interposer size would no longer be limited to photolithography maximum field dimensions (e.g., typically 25 mm×34 mm). Being processed at wafer-level, LICLs can be used to interconnect optically neighboring fields and generate dies made up of N fields. Together with electrical redistribution layers (RDL), both electrical and optical interconnection can be realized. A potential concern in integrated systems can be the energy consumption. In microprocessors, almost 80% of the energy may be used for data transmission and 20% for logic. The main portion of the energy consumption can result from the micro-processor and the external memory. Microprocessors and memory can use the same process flow and fabrication technology. Thus, using the interlaced approach enabled by a MICS, together with optical communication, one may be able to significantly reduce the energy consumption and improve consequently the communication speed. In such an integrated system, the LICLs may also be used for clock distribution.

Additionally, active opto-electrical functionality may be included in the LICLs in a MICS (e.g., via the silicon dioxide matrix with electro-active nano-particles). Such functionality may include: phase changes, absorption, and amplification.

FIGS. 4A-D show an example MICS 400 during various stages of an example fabrication process. The fabrication process can involve dedicated oxide deposition, patterning, and encapsulation (e.g., TEOS encapsulation) just before etching the electric pad access.

Figure 4A:
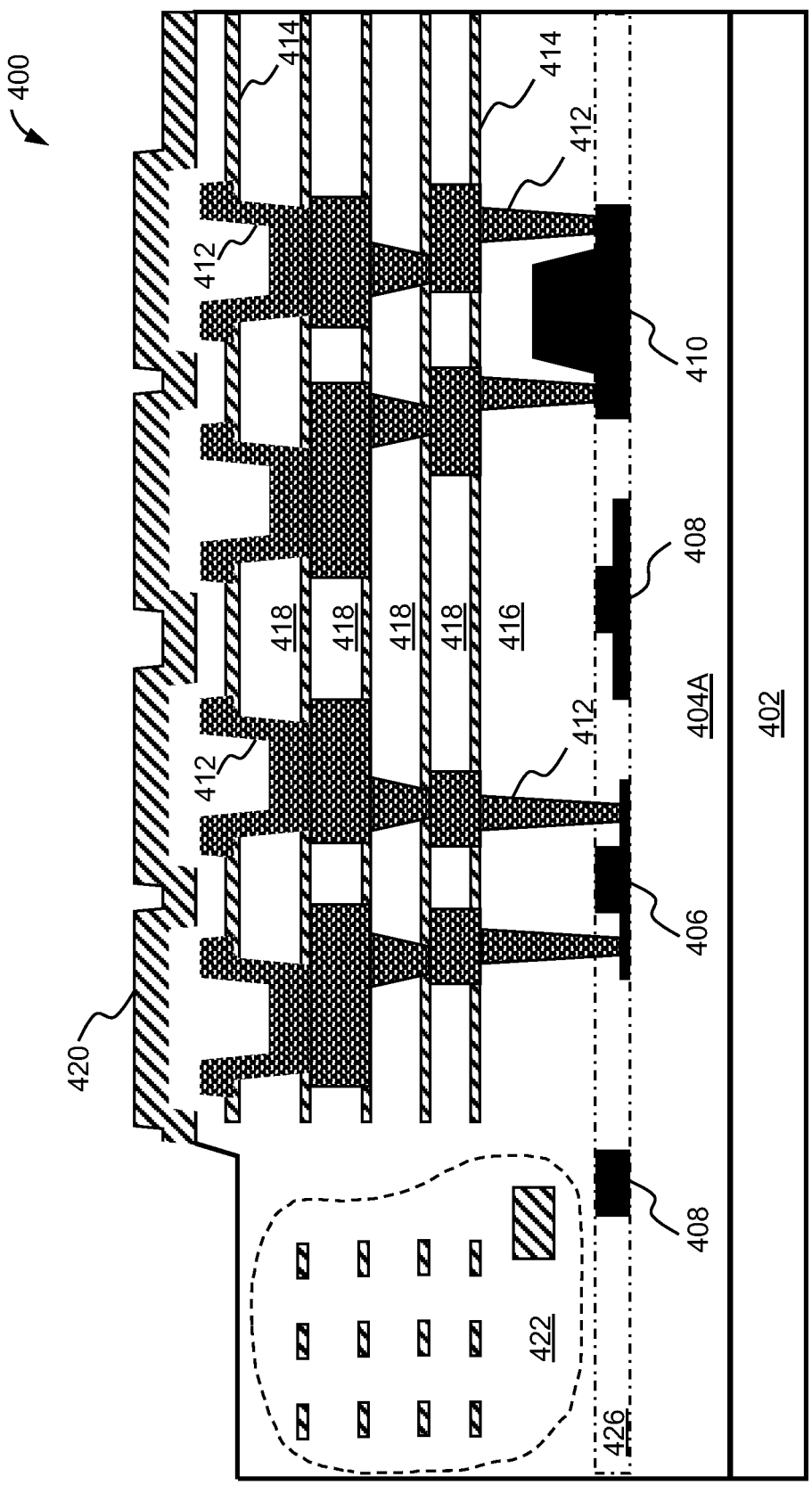
FIG. 4A is a schematic diagram of a portion of an example multi-index contrast structure during the fabrication process, viewed from the side.

FIG. 4A shows a MICS 400 before the addition of one or more LICLs. The MICS 400 in this example includes a Si handle 402 and a $SiO_2$ buried oxide layer 404. Various structures can be included in the MICS 400, such as a silicon phase shifter 406, a silicon waveguide 408, and a germanium-on-silicon photodiode 410. Some of these structures may be fabricated within a set of HICLs formed around a device layer 426. Conductive components 412, which can be composed of different chemical elements (e.g., copper, aluminum), allow for electrical connections across the MICS 400 (e.g., from an electrical pad located on the exterior of the MICS 400 to a structure located inside of the MICS 400, such as the silicon phase shifter 406 and the germanium-on-silicon photodiode 410. The MICS 400 may include one or more etch stop layers 414 (e.g., SiN), pre-metal dielectric layers 416 (e.g., $SiO_2$), inter-layer dielectric layers 418 (e.g., $SiO_2$), and passivation layers 420 of possibly different chemical composition (e.g., $SiO_2$, SiN). An SSC 422 is included in the MICS 400, which can optically connect one or more LICLs to one or more structures (e.g., a silicon waveguide 408) in the HICL device layer 426. The SSC 422 can optically couple between one or more vertical layers of the device, and is able to optically couple between structures that are horizontally offset from one another. The example of the SSC 422 is a multi-rod design, although other designs may be used as well.

Figure 4B:
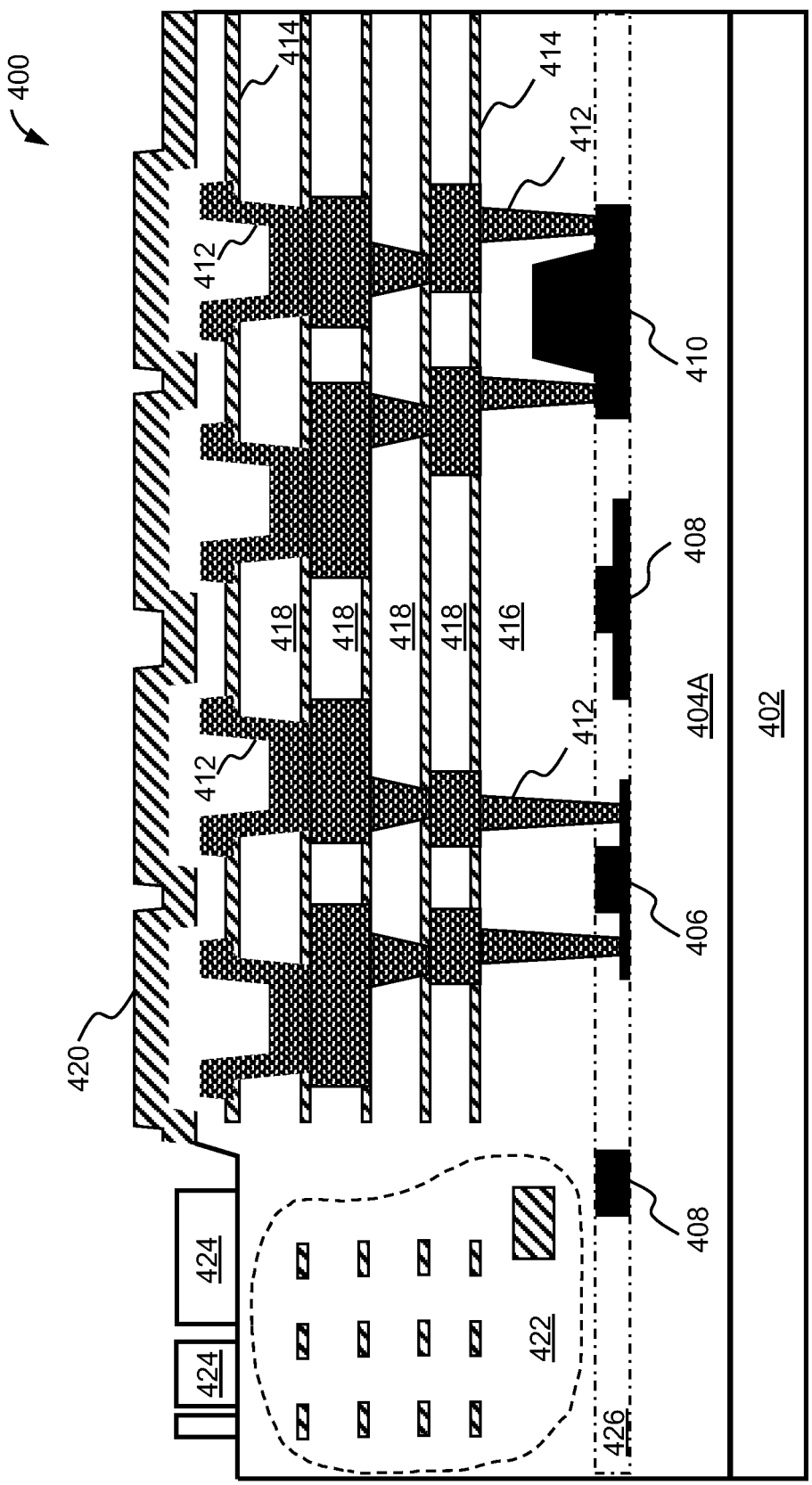
FIG. 4B is a schematic diagram of a portion of an example multi-index contrast structure during the fabrication process, viewed from the side.

FIG. 4B shows the MICS 400 after the addition of core structures 424 of a top set of LICLs. The core structures 424 can be fabricated by performing oxide deposition followed by patterning. The SSC 422 and other SSCs in the MICS 400 are able to optically connect waveguides in one or more sets of LICLs to waveguides in one or more sets of HICLs.

Figure 4C:
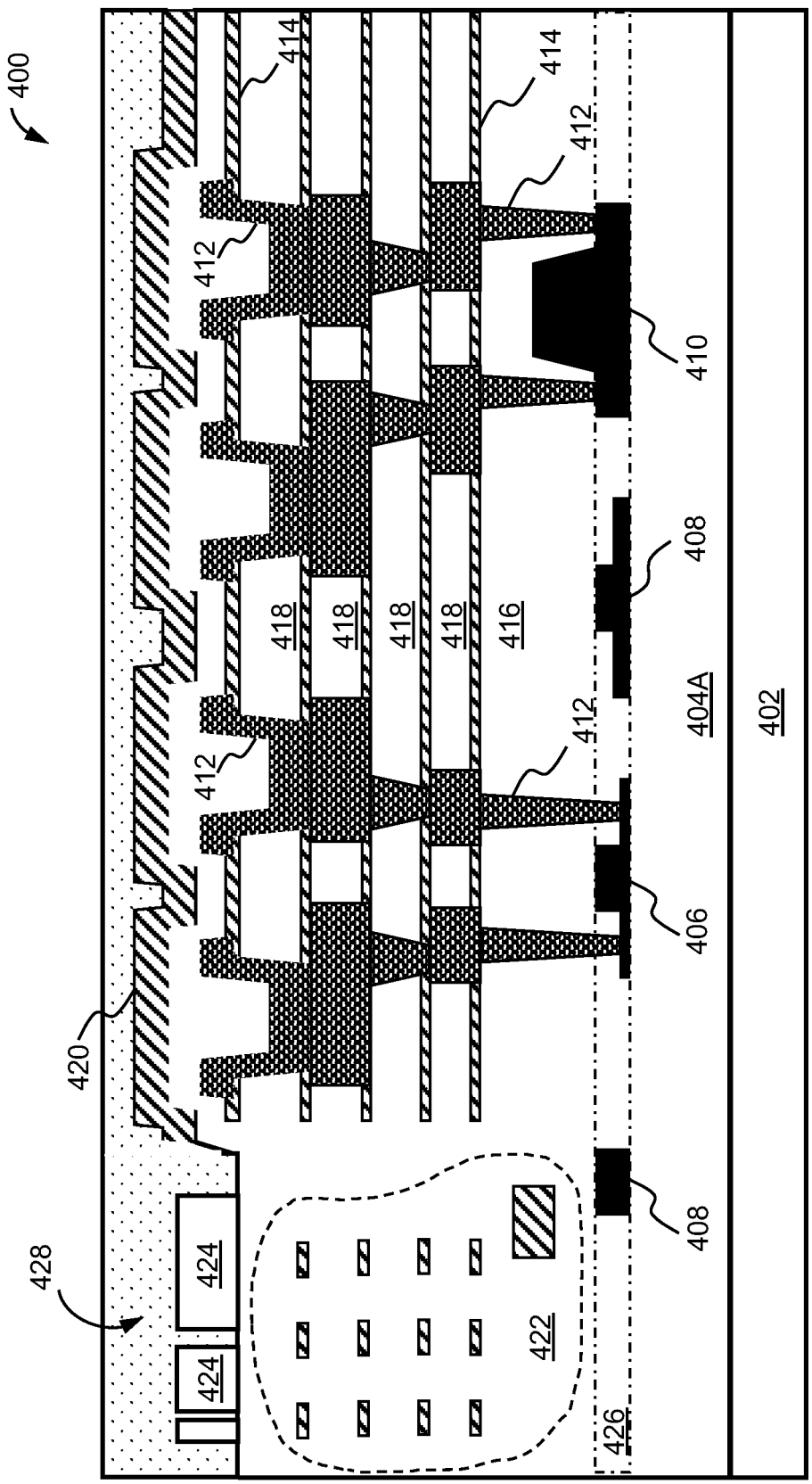
FIG. 4C is a schematic diagram of a portion of an example multi-index contrast structure during the fabrication process, viewed from the side.

FIG. 4C shows the MICS 400 after the addition of an encapsulation layer 428. The encapsulation layer 428 may act as a cladding to confine light within the LICLs comprising the core structures 424 and the encapsulation layer 428, and may also serve to protect the MICS 400 from the environment.

Figure 4D:
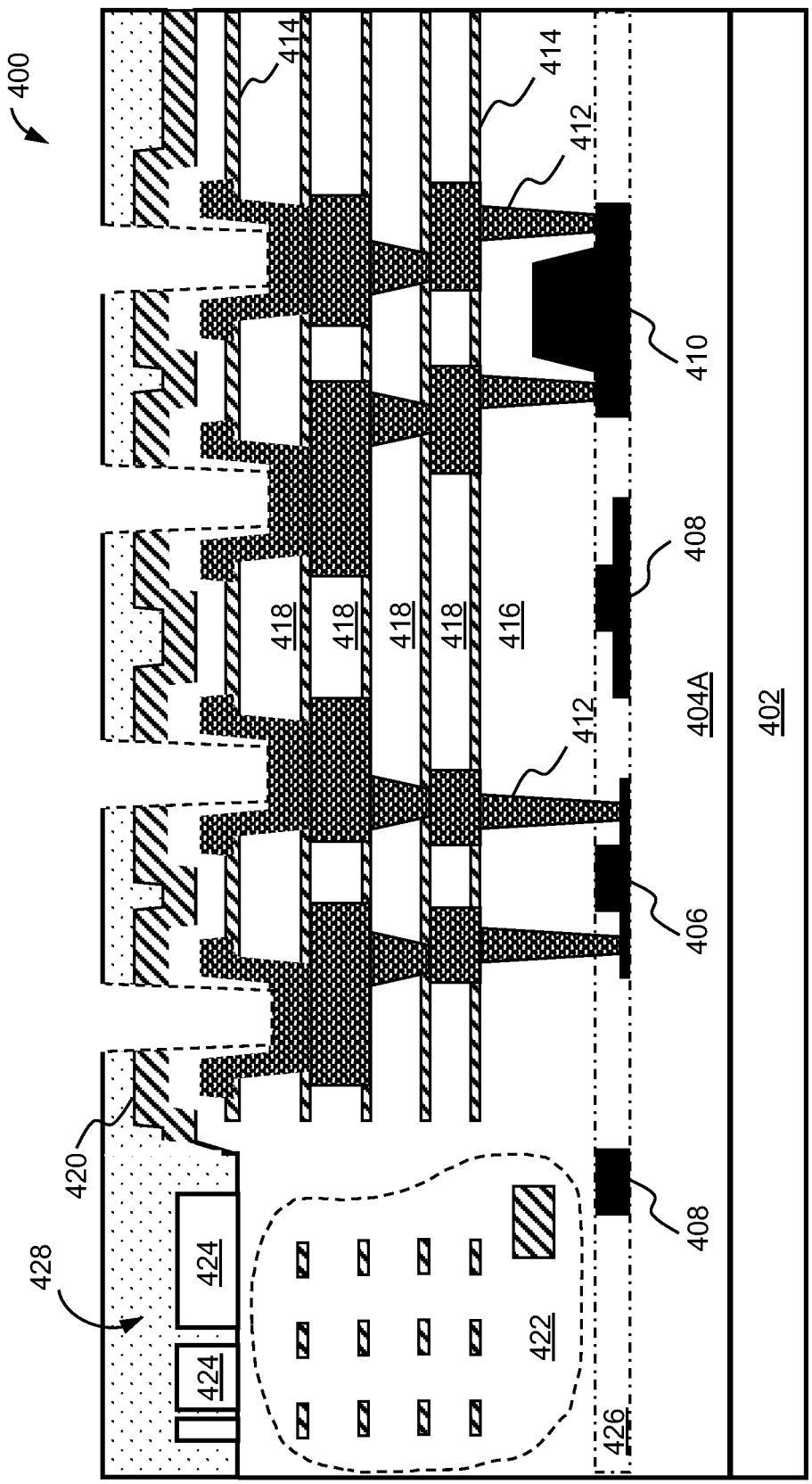
FIG. 4D is a schematic diagram of a portion of an example multi-index contrast structure, viewed from the side.

FIG. 4D shows the MICS 400 after removing one or more layers to allow for electrical connectivity to one or more of the conductive components 412.

Figure 5A:
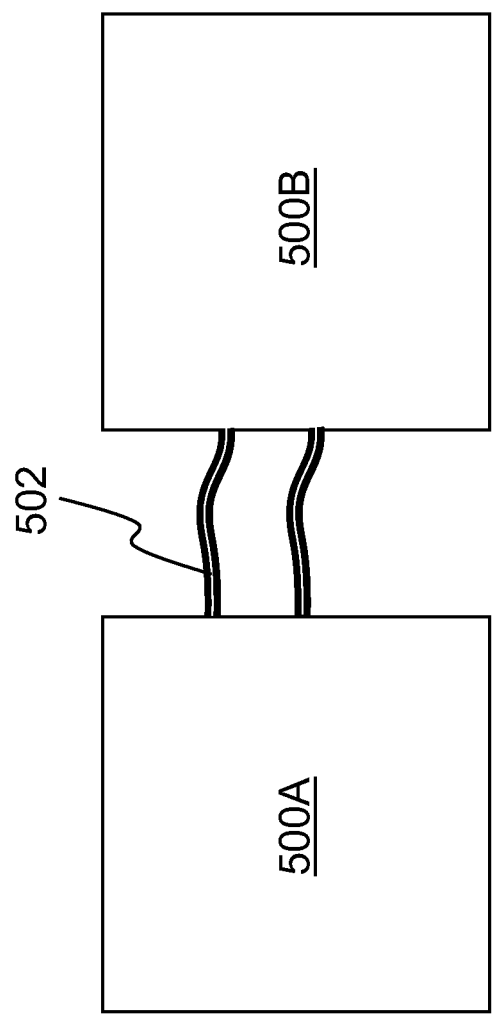
FIG. 5A is a schematic diagram of an example of two photonic dies optically connected at the package level.

FIG. 5A shows an example of two photonic integrated circuit dies 500A and 500B optically connected at the package level via a package level optical interconnect 502.

Figure 5B:
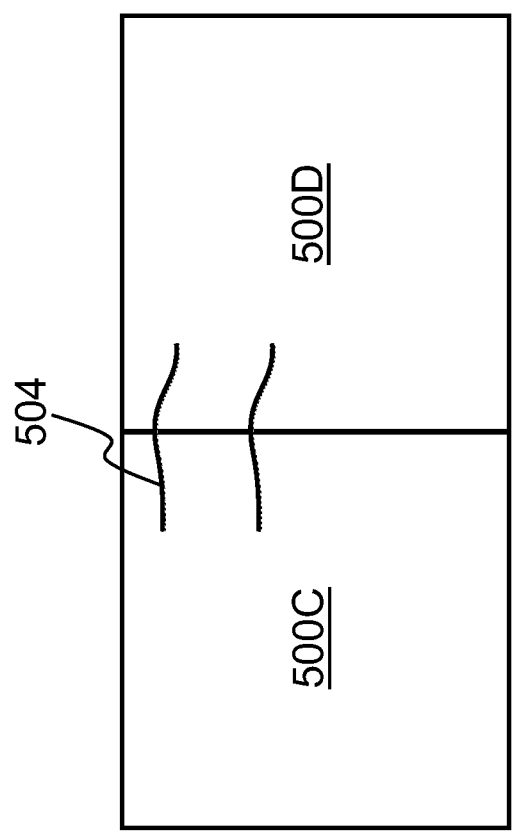
FIG. 5B is a schematic diagram of an example of two photonic dies optically connected at the die level via a multi-index contrast structure.

FIG. 5B shows an example of two photonic fields 500C and 500D that are part of a common photonic die optically connected at the die level via waveguide structures 504 of a MICS. In contrast to FIG. 5A, where two separate packages with different dies are optically connected at the package level, the MICS 504 allows for optical interconnectivity at the die level between two fields of a single macro die.

Figure 6A:
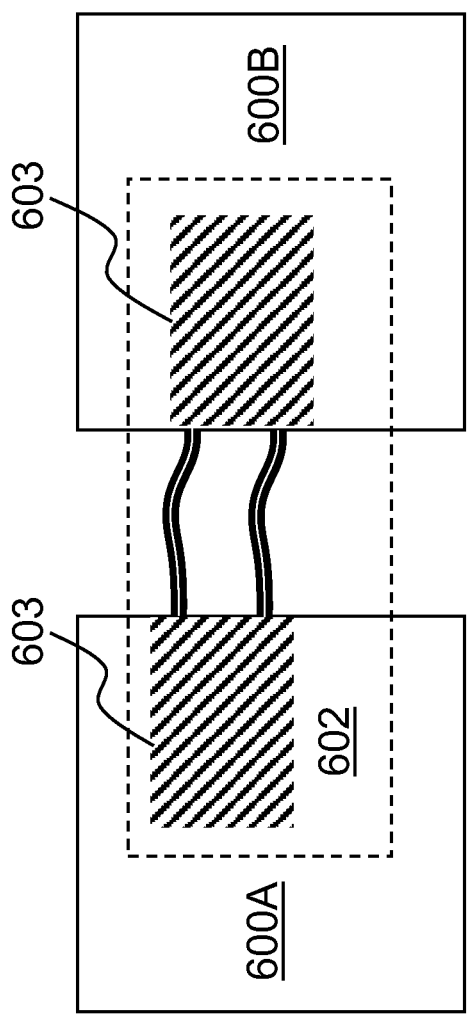
FIG. 6A is a schematic diagram of an example of two CMOS dies electrically connected at the package level.

FIG. 6A shows an example of two electronic integrated circuit dies 600A and 600B electrically connected at the package level via a package level electrical interconnect 602 comprising two electrical transceiver engines 603.

Figure 6B:
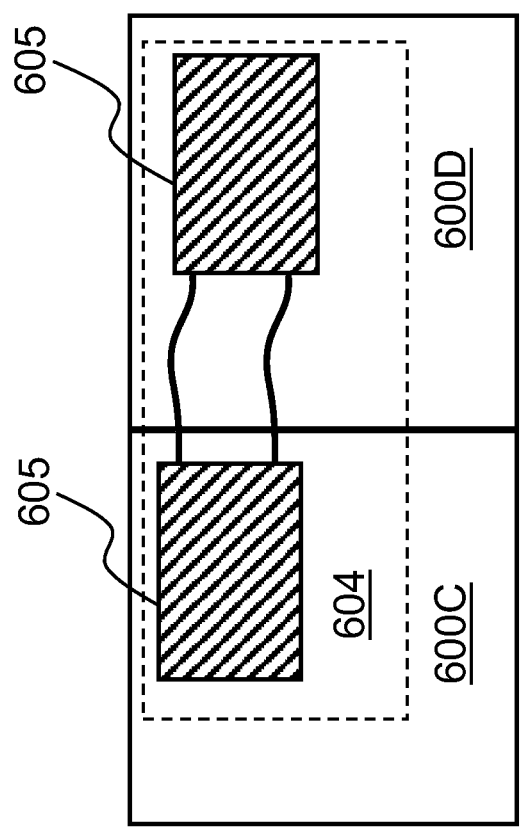
FIG. 6B is a schematic diagram of an example of two CMOS dies optically connected at the die level via a multi-index contrast structure.

FIG. 6B shows an example of two electronic fields 600C and 600D that are part of a common electronic die optically connected at the die level via a MICS 604 and two optical transceiver engines 605. In contrast to FIG. 6A, where two separate packages with different dies are electrically connected at the package level, the MICS 604 allows for optical interconnectivity at the die level between two fields of a single macro die. Electrical signals within the dies 600C and 600D may be converted to optical signals which are then transmitted via the MICS 604 and the optical transceiver engines 605.

For illustration purposes, the refractive index of the core of standard $GeSiO_2$ in a LICL may be around 1.47 (e.g., around an optical wavelength of 1310 nm). LICL structures could have relatively large sizes. The core size could be on the order of 3 μm×3 μm, for example, or larger (e.g., 8 μm×8 μm). Its cladding would have an index close to the standard $SiO_2$ crystal value of 1.447. The resulting index contrasts of such LICLs would be around 0.25% to around 1.5%. This LICL design is fully reproducible by use of a variety of process steps, including the process steps described above. For illustration purposes, the refractive index of the core of Si in a HICL may be around 3.48 (e.g., around an optical wavelength of 1550 nm). HICL structures could have relatively small sizes. For a rectangular (e.g., "strip" configuration) kind of silicon waveguide, typical waveguide sizes could be in the range of around 400-500 nm (width)×150-300 nm (height). There can also be other relevant dimensions depending on the waveguide configuration. For example, there can be other types of waveguides (e.g., "rib" configuration) where there are two etch steps, e.g., a core on top of a continuous slab.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An article of manufacture comprising:
   one or more sets of lower index contrast layers, each set of lower index contrast layers
      comprising three or more layers, each layer formed from a corresponding material, where at least two of the corresponding materials have a different index of refraction from each other, and the corresponding materials include a first material as a core layer, a second material on top of the first material as a top cladding layer, and a third material below the first material as a bottom cladding layer, with the first material being different from the second material and different from the third material, and the first material comprising an oxide, and
      being configured to provide optical confinement based at least in part on a first numerical difference between at least two different indices of refraction of the materials of that lower index contrast layer, for optical waves having a peak wavelength between about 100 nm to about 1 mm; and
   one or more sets of higher index contrast layers, each set of higher index contrast layers
      comprising three or more layers, each layer formed from a corresponding material, where at least two of the corresponding materials have a different index of refraction from each other, and the corresponding materials include a fourth material as a core layer, a fifth material on top of the fourth material as a top cladding layer, and a sixth material below the fourth material as a bottom cladding layer, with the fourth material being different from the fifth material and different from the sixth material, and
      being configured to provide optical confinement based at least in part on a second numerical difference between the two different indices of refraction of the materials of that higher index contrast layer, for optical waves having a peak wavelength between about 100 nm to about 1 mm; and
   at least one optical coupler configured to optically couple a first of the one or more sets of lower index contrast layers to a first of the one or more sets of higher index contrast layers;
   wherein the first numerical difference is smaller than the second numerical difference.

2. The article of manufacture of claim 1, wherein the optical coupler comprises a spot size converter that is configured to provide coupling between guided mode sizes that differ by at least a factor of four.

3. The article of manufacture of claim 2, wherein the spot size converter comprises a plurality of segments of a material having an index of refraction that is
   higher than an index of refraction of a material having a lowest index of refraction of the first of the one or more sets of lower index contrast layers, and
   higher than an index of refraction of a material having a lowest index of refraction of the first of the one or more sets of higher index contrast layers.

4. The article of manufacture of claim 2, wherein the spot size converter comprises one or more segments of varying size transverse to a propagation axis of a guided mode of the first of the one or more sets of lower index contrast layers or a guided mode of the first of the one or more sets of higher index contrast layers.

5. The article of manufacture of claim 1, wherein the optical coupler is located in one or more layers between the first of the one or more sets of lower index contrast layers and the first of the one or more sets of higher index contrast layers.

6. The article of manufacture of claim 1, wherein the optical coupler comprises at least one segment in a layer that is in an overlapping plane with
   a layer in the first of the one or more sets of lower index contrast layers, or
   a layer in the first of the one or more sets of higher index contrast layers.

7. The article of manufacture of claim 1, further comprising a second optical coupler that optically couples at least one of the one or more sets of lower index contrast layers to an external waveguide.

8. The article of manufacture of claim 1, further comprising one or more optical elements located within at least one of the one or more sets of lower index contrast layers, wherein the one or more optical elements are configured to separate and/or combine light.

9. The article of manufacture of claim 1, further comprising one or more electrically conductive elements that conduct current from one or more exposed electrical pads to one or more electro-optical elements.

10. The article of manufacture of claim 9, wherein the one or more electro-optical elements comprise at least one of a phase shifter or a photodiode.

11. The article of manufacture of claim 9, wherein the one or more electro-optical elements are located within at least one of the one or more sets of higher index contrast layers.

12. The article of manufacture of claim 1, wherein at least one of the one or more sets of lower index contrast layers is located over at least two different sets of higher index contrast layers located in different respective patterned portions of a wafer.

13. The article of manufacture of claim 1, wherein the second material and the third material each comprise silicon dioxide, and the oxide has an index of refraction higher than an index of refraction of silicon dioxide.

14. The article of manufacture of claim 1, wherein the oxide comprises at least one of:
   silicon rich oxide (SRO), Phosphosilicate glass (PSG), Fluorosilicate glass (FSG), or Borosilicate glass (BSG).

15. The article of manufacture of claim 1, wherein the first of the one or more sets of higher index contrast layers is formed on a silicon-on-insulator die, with the fourth material comprising a silicon layer on the silicon-on-insulator die.

16. The article of manufacture of claim 15, wherein the first of the one or more sets of lower index contrast layers is formed on the silicon-on-insulator die, with the first material comprising the oxide deposited on a layer over the silicon-on-insulator die.

17. A method comprising:
   forming one or more sets of lower index contrast layers, each set of lower index contrast layers
      comprising three or more layers, each layer formed from a corresponding material, where at least two of the corresponding materials have a different index of refraction from each other, and the corresponding materials include a first material as a core layer, a second material on top of the first material as a top cladding layer, and a third material below the first material as a bottom cladding layer, with the first material being different from the second material and different from the third material, and the first material comprising an oxide, and being configured to provide optical confinement based at least in part on a first numerical difference between at least two different indices of refraction of the materials of that lower index contrast layer, for optical waves having a peak wavelength between about 100 nm to about 1 mm; and forming one or more sets of higher index contrast layers, each set of higher index contrast layers comprising three or more layers, each layer formed from a corresponding material, where at least two of the corresponding materials have a different index of refraction from each other, and the corresponding materials include a fourth material as a core layer, a fifth material on top of the fourth material as a top cladding layer, and a sixth material below the fourth material as a bottom cladding layer, with the fourth material being different from the fifth material and different from the sixth material, and being configured to provide optical confinement based at least in part on a second numerical difference between the two different indices of refraction of the materials of that higher index contrast layer, for optical waves having a peak wavelength between about 100 nm to about 1 mm; and forming at least one optical coupler configured to optically couple a first of the one or more sets of lower index contrast layers to a first of the one or more sets of higher index contrast layers;

wherein the first numerical difference is smaller than the second numerical difference.

18. The method of claim 17, wherein the optical coupler comprises a spot size converter that is configured to provide coupling between guided mode sizes that differ by at least a factor of four.

19. The method of claim 18, wherein the spot size converter comprises a plurality of segments of a material having an index of refraction that is higher than an index of refraction of a material having a lowest index of refraction of the first of the one or more sets of lower index contrast layers, and higher than an index of refraction of a material having a lowest index of refraction of the first of the one or more sets of higher index contrast layers.

20. The method of claim 18, wherein the spot size converter comprises one or more segments of varying size transverse to a propagation axis of a guided mode of the first of the one or more sets of lower index contrast layers or a guided mode of the first of the one or more sets of higher index contrast layers.

* * * * *